(12) United States Patent
Manchester

(10) Patent No.: US 6,254,311 B1
(45) Date of Patent: Jul. 3, 2001

(54) REMOVAL OF GROUND CONTAMINENTS

(75) Inventor: Kenneth Manchester, Butte, MT (US)

(73) Assignee: MSE Technology Applications, Inc., Butte, MT (US)

( * ) Notice: Subject to any disclaimer, the term of this patent is extended or adjusted under 35 U.S.C. 154(b) by 0 days.

(21) Appl. No.: 09/404,730

(22) Filed: Sep. 24, 1999

(51) Int. Cl.[7] .............................. E21B 43/18; B08B 5/04; B09C 1/00; B09C 1/02
(52) U.S. Cl. ................. 405/128.25; 166/370; 405/128.2; 210/747
(58) Field of Search .................................. 166/267, 268, 166/278, 313, 369, 370; 210/170, 747; 405/128.2, 128.25

(56) References Cited

U.S. PATENT DOCUMENTS

| | | | |
|---|---|---|---|
| 4,593,760 | * | 6/1986 | Visser et al. ..................... 166/267 |
| 4,886,119 | * | 12/1989 | Bernhardt et al. .................... 166/267 |
| 5,389,267 | * | 2/1995 | Gorelick et al. ...................... 210/758 |
| 5,439,594 | * | 8/1995 | Regan et al. .......................... 210/747 |
| 5,464,309 | * | 11/1995 | Mancini et al. ...................... 405/258 |
| 5,673,752 | * | 10/1997 | Scudder et al. ....................... 166/265 |
| 5,855,775 | * | 1/1999 | Kerfoot ................................ 210/170 |
| 5,879,108 | * | 3/1999 | Haddad ............................ 405/128.45 |

* cited by examiner

Primary Examiner—David Bagnell
Assistant Examiner—Jennifer M Hawkins
(74) Attorney, Agent, or Firm—Peter Tribulski

(57) ABSTRACT

Removal of Light, non-Aqueous Phase Liquids (LNAPLs) from contaminated soils is expedited by injecting gas into extraction wells. The extraction wells are operated with a vacuum assist which produces a mounding of groundwater around the well. Gas is injected into the groundwater within the extraction well in the form of micro-bubbles. The bubbles rise through the LNAPL and volatilize it. The volatilized LNAPL is drawn to the surface and groundwater is left in the well.

3 Claims, 1 Drawing Sheet

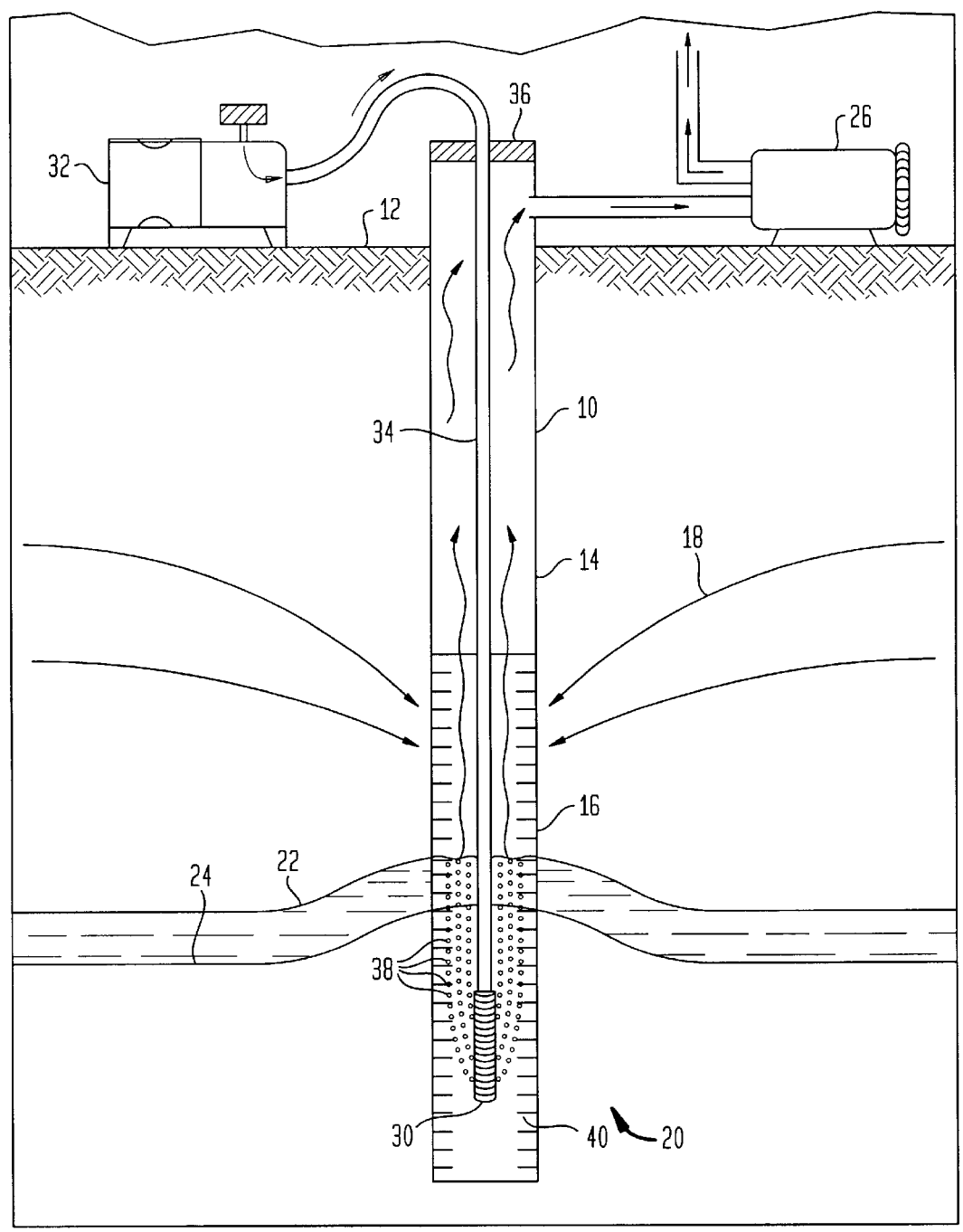

REMOVAL OF GROUND CONTAMINENTS

FIELD OF THE INVENTION

The invention relates to removing volatile contaminants from soil.

BACKGROUND OF THE INVENTION

There are numerous instances in which underground storage tanks have leaked and surrounding soils and groundwater have become contaminated with the contents of the tanks. In some cases a contaminating liquid is spilled on a surface of soil and migrates into the soil. Through these and other mechanisms, there have been many occurrences of soil contamination by liquids which can be generically described as Light, Non-Aqueous Phase Liquids (LNAPLs). When LNAPLs are present in a soil, the region of contamination is referred to as a plume.

In-situ recovery or removal of these LNAPLs from a soil subsurface can be problematic, especially in finer grained materials exhibiting lower permeability. The most common technique for such recovery involves installing a group of wells within the LNAPL plume area. The goal of this technique is to allow the LNAPLs to migrate into the wells across a natural pressure gradient. After the LNAPLs are in the wells, they are extracted and carried away from the contaminated site.

This commonly employed technique is very slow and expensive to implement. Various prior art systems have been devised in an effort to improve the efficacy of a well extraction technique. These efforts have focused on increasing the pressure gradient to which the LNAPLs are subjected so that they migrate more rapidly to the extraction wells.

In one prior art technique, the water table is depressed by pumping. This increases LNAPL recovery by increasing the gradient to the well. However, this technique tends to smear the LNAPL downward, thus increasing the dissolved contaminant levels when the pump is shut down. In addition, disposal of contaminated pumped groundwater becomes a problem and adds to overall treatment costs.

In another prior art technique, vacuum is applied to one or more of the recovery wells. This produces an increase in the gradient and an improved rate of LNAPL collection in the well. In some instances, air injection wells are placed in the plume. This provides for an improved flow of air through the plume and improves the recovery rate. These prior art techniques are described in U.S. Pat. No. 4,593,760 (Visser et al.), issued Jun. 10, 1986.

When the vacuum assisted recovery technique is employed, there is an effort made to locate a collection area of the well at a depth that is just above the water table height. This is done in an effort to minimize the amount of groundwater that is extracted when the collected LNAPLs are pumped out of the well. However, the presence of vacuum in the well produces a mounding of the groundwater near the well and collection of groundwater along with LNAPLs is inevitable.

In the prior art, LNAPLs are pumped from the extraction wells with skimmer pumps which are designed to minimize the amount of groundwater that is pumped to the surface.

In spite of carefully controlling well depth in relation to water table height and in spite of using sophisticated skimmer pumps, there has heretofore been no way of extracting LNAPLs without extracting some amount of co-mingled groundwater.

When contaminated groundwater is brought to the surface two problems develop. First of all, the groundwater increases the mass of materials which must be carried away from the site and disposed at substantial expense. An even greater problem develops in geographic locations where winter conditions cause freezing of the groundwater that reaches the surface. This freezing requires that remediation operations must be suspended during winter months or that the system must be constructed to allow cold weather operations. These factors add greatly to the cost and overall length of time of a remedial operation.

It is a goal of the present invention to provide a technique for rapidly extracting LNAPLs from contaminated soil without having the LNAPLs co-mingled with groundwater.

SUMMARY OF THE INVENTION

The present invention is directed to a method of extracting LNAPL from soil with a vacuum enhanced extraction well. The method involves the step of injecting a gas into the well at a depth below a level at which the LNAPL is accumulated in the well. The gas forms bubbles in the LNAPL and the gas rising out of the well conveys the LNAPL out of the well as a vapor volatilized by the gas. No groundwater is extracted from the well during this removal process.

Viewed from another aspect, the present invention is directed to an apparatus for extracting LNAPL from soil with a vacuum enhanced extraction well. The apparatus comprises a means for injecting a gas into a the well at a depth below a level at which the LNAPL is accumulated in the well. The gas forms bubbles in the LNAPL The gas rising out of the well conveys the LNAPL out of the well as a vapor volatilized by the gas.

The invention will be better understood from the following detailed description taken in consideration with the accompanying drawings and claims.

BRIEF DESCRIPTION OF THE DRAWINGS

FIG. 1 shows a schematic cross-sectional view of an extraction well operating in accordance with the present invention.

The drawing is not necessarily to scale.

DETAILED DESCRIPTION

Referring now to FIG. 1, there is shown a cross-sectional view of an extraction well 10 positioned within some contaminated soil 12. The well 10 has a solid casing 14 along its upper length and a well screen 16 along its lower length. The well screen 16 is set to straddle an unsaturated zone 18 and a saturated zone 20 of the soil 12.

A free-product layer 22 of Light, Non-Aqueous Phase Liquid (LNAPL) is shown in position between the zones 18 and 20. The unsaturated zone 18 contains some of the LNAPL in a vapor form. The saturated zone 20 is relatively free of the LNAPL, because a top surface 24 of the zone 20 is the top of a naturally occurring water table. The LNAPL effectively floats on top of the water table.

The well 10 is connected to a conventional vacuum blower 26. The vacuum blower 26, reduces the air pressure within the well 10 and increases a pressure gradient within the unsaturated zone 18. This causes the LNAPL to migrate to and through the well screen 16. The LNAPL accumulates in the well 10 at a level that corresponds to the level of the free product layer 22.

In accordance with the present invention, a source of gas 30 is positioned in the well 10 at a level below the free-product layer 22. The source 30 is connected to a gas compressor 32 through a tube 34. The well is covered with a gas tight cap 36.

In one embodiment of the present invention, the gas is air and the source 30 is a sparge point made of a micro-porous material such as polyethylene.

In this embodiment, air emerges from the source 30 in the form of thousands of small bubbles 38. The bubbles rise through the layer 22 of LNAPL. Because the bubbles 38 are small and numerous, there is a high surface area across which the LNAPL becomes volatilized in the gas.

The volatilized LNAPL is drawn upwardly out of the well by the vacuum blower 26. In some instances the volatilized LNAPL is simply discharged to the atmosphere as a vapor. In more restrictive situations the LNAPL vapor is collected using a conventional carbon collector (not shown) for disposal in accordance with local requirements.

The bubbles 38 are shown passing through some accumulated groundwater 40 which is inevitably mounded around the well 10 by the vacuum blower 26. The bubbles 38 do not absorb a high amount of water vapor because of a relatively low volatility of the water. The vapor pressure of the gas in the bubbles 38 is very low when the bubbles reach the layer 22. Consequently, the bubbles are very effective in conveying large quantities of the LNAPL to the surface.

An additional benefit is provided when either air or oxygen is used as the injected gas. Oxygen stimulates biodegradation of contaminants. This results in improved remediation rates.

ILLUSTRATIVE EXAMPLE

In one experimental trial, the inventive method was employed to de-contaminate a plume of 25,000 sq. ft. The LNAPL was gasoline. Air was injected into 8 wells through sparge points made from micro-porous polyethylene. Air was injected at a pressure of 10–15 psi. The air was injected for a period of one year. The application of the inventive method was conducted through winter months without suspension; no problematic freezing occurred. Approximately 375 gallons or 2650 pounds of LNAPL were withdrawn from the plume.

It is to be appreciated and understood that the specific embodiments of the invention describe herein are merely illustrative of the general principles of the invention. Various modifications may be made by those skilled in the art which are consistent with the principles set forth. For example gases with a high concentration of oxygen may be used if economic conditions warrant such use.

What is claimed is:

1. A method of extracting LNAPL from soil with a vacuum enhanced extraction well which comprises the steps of:

injecting a pressurized gas into the well at a depth below a level at which the LNAPL is accumulated in the well;

maintaining the gas injection pressure high enough to produce gas flow through a microporous material, whereby the gas forms thousands of small bubles in the LNAPL and the gas rising out of the well conveys the LNAPL out of the well as a vapor volatilized by the gas, and maintaining the flow rate of the pressurized gas low enough to preclude extraction of any liquid phase materials from the well.

2. The method of claim 1 wherein the gas contains oxygen.

3. The method of claim 2 wherein the gas is air.

* * * * *